US012629613B2

(12) United States Patent
Giselbrecht et al.

(10) Patent No.: US 12,629,613 B2
(45) Date of Patent: May 19, 2026

(54) APPARATUS AND METHOD FOR DEGASSING A DEVICE, AND CORRESPONDING TEST SYSTEM FOR GAS ANALYSIS

(71) Applicant: Omicron electronics GmbH, Klaus (AT)

(72) Inventors: Dietmar Giselbrecht, Bregenz (AT); Martin Anglhuber, Feldkirch (AT)

(73) Assignee: Omicron electronics GmbH, Klaus (AT)

( * ) Notice: Subject to any disclaimer, the term of this patent is extended or adjusted under 35 U.S.C. 154(b) by 373 days.

(21) Appl. No.: 18/249,239

(22) PCT Filed: Oct. 6, 2021

(86) PCT No.: PCT/EP2021/077570
§ 371 (c)(1),
(2) Date: Apr. 14, 2023

(87) PCT Pub. No.: WO2022/084042
PCT Pub. Date: Apr. 28, 2022

(65) Prior Publication Data
US 2023/0390668 A1      Dec. 7, 2023

(30) Foreign Application Priority Data
Oct. 19, 2020    (AT) ............................... A 50895/2020

(51) Int. Cl.
*B01D 19/00*        (2006.01)
(52) U.S. Cl.
CPC ................................ *B01D 19/0063* (2013.01)

(58) Field of Classification Search
CPC ................ B01D 19/0063; B01D 19/00; G01N 2001/2229; G01N 33/2841; H01J 9/385
(Continued)

(56) References Cited

U.S. PATENT DOCUMENTS 4,407,665 A    10/1983  Lasater
4,456,172 A     6/1984  Roffelsen
(Continued)

FOREIGN PATENT DOCUMENTS

CN          101444648 A      6/2009
CN          203133096 U      8/2013
(Continued)

OTHER PUBLICATIONS

Shuying Li, *Degassing Rate Determination Method and Its Application*, Hebei Electric Power Technology, Issue 06, 30-34 (Dec. 25, 1987).
(Continued)

*Primary Examiner* — T. Bennett McKenzie
(74) *Attorney, Agent, or Firm* — Cook Alex Ltd.

(57)        ABSTRACT

In order to degas a device (7), an apparatus (10) is provided that comprises a control unit (19), a pump (3), a first volume (1), a second volume (2), a first valve (12) and a second valve (13). At the discharge end, the pump (3) is connected to the first volume (1), and at the intake end, the pump (3) is connected to the second volume (2) via the second valve (13) and can be connected to the device (7) to be degassed. The first volume (1) and the second volume (2) are connected via the first valve (12).

18 Claims, 2 Drawing Sheets

(58) Field of Classification Search
USPC ........................................................... 96/155
See application file for complete search history.

(56) References Cited

U.S. PATENT DOCUMENTS

| | | | |
|---|---|---|---|
| 4,763,514 | A | 8/1988 | Naito et al. |
| 2004/0159096 | A1 | 8/2004 | Yasui et al. |
| 2009/0320841 | A1 | 12/2009 | Haveri |
| 2011/0138768 | A1* | 6/2011 | Draper ...................... F02C 3/34 |
| | | | 60/39.52 |
| 2011/0259466 | A1 | 10/2011 | Tastard et al. |
| 2012/0100630 | A1 | 4/2012 | Wimberger-Friedl et al. |
| 2013/0156646 | A1 | 6/2013 | Bernhard |
| 2015/0020530 | A1* | 1/2015 | Pandey ..................... F02C 3/30 |
| | | | 60/39.5 |
| 2016/0376992 | A1* | 12/2016 | Davis, Jr. .................. F02C 3/04 |
| | | | 60/39.5 |
| 2020/0360586 | A1 | 11/2020 | Peters et al. |
| 2023/0390669 | A1 | 12/2023 | Giselbrecht et al. |

FOREIGN PATENT DOCUMENTS

| | | | | | |
|---|---|---|---|---|---|
| CN | 205229169 | U | 5/2016 | | |
| CN | 105921066 | A | 9/2016 | | |
| CN | 208984599 | U | 6/2019 | | |
| CN | 210674325 | | 6/2020 | | |
| DE | 2358068 | | 6/1974 | | |
| DE | 20217473 | | 3/2003 | | |
| DE | 10252652 | | 5/2004 | | |
| DE | 102017126136 | | 5/2019 | | |
| DE | 102017126136 | A1 * | 5/2019 | .......... | A61M 1/1658 |
| DE | 102018119715 | | 1/2020 | | |
| GB | 1417028 | | 12/1975 | | |
| JP | H109128 | A | 1/1998 | | |
| WO | WO 95/28626 | | 10/1995 | | |
| WO | WO2012/045404 | | 4/2012 | | |
| WO | WO 2017/125214 | | 7/2017 | | |

OTHER PUBLICATIONS

Xu et al., *Design of a Gas Separation System Based on Thermal Transpiration Effect*, Contemporary Chemical Industry, vol. 47, No. 01, 95-97, 112 (Jan. 28, 2018).

Zhang et al., *A Small Vacuum Online Degassing Technology in Oil Dissolved Gas Chromatography*, Automation of Electric Power Systems, vol. 31, No. 11, 92-96 (Jun. 10, 2007).

International Search Report with English translation, counterpart International Appl. No. PCT/EP2021/077570 (Jan. 19, 2022) (8 pages).

* cited by examiner

1

APPARATUS AND METHOD FOR DEGASSING A DEVICE, AND CORRESPONDING TEST SYSTEM FOR GAS ANALYSIS

The present application is a U.S. National Stage of PCT International Patent Application No. PCT/EP2021/077570, filed Oct. 6, 2021, which claims priority to Austrian Application No. A50895/2020, filed Oct. 19, 2020, both of which are hereby incorporated herein by reference.

FIELD OF THE INVENTION

The present invention relates to an apparatus and a method for degassing a device, wherein extracted gases are compressed, for example in order to be able to better analyze dissolved gases.

BACKGROUND OF THE INVENTION

The analysis of gases dissolved in an insulating oil (Dissolved Gas Analysis (DGA)) is an important approach, for example for state determination and error recognition of oil-paper-insulated power transformers. Prior to the analysis, the gases to be analyzed must be freed from the insulating oil, for example, which is known as degassing. Such degassing can take place via various methods. The highest extraction rate is achieved with a full degassing by means of a vacuum.

The extraction of the gas from the insulating oil, for example, is all the more effective, the lower the pressure in the vessel or volume which receives the gas is. Degassing pumps, with which such an extraction of the gas is performed, also function all the more efficiently the lower the differential pressure between the pressure at the intake of the pump and the pressure at the discharge of the pump is. Therefore, the volume at the discharge end of the pump according to the prior art is selected such that the pressure in this volume does not rise too greatly during degassing or extraction.

However, numerous analysis methods require as high a concentration of gas as possible in order to be able to detect, as well as possible, certain gas components or certain gases contained in the extracted gas.

SUMMARY OF THE INVENTION

Therefore, the present invention sets itself the task of working with a low pressure of extracted gas during the degassing, whereas work is carried out with a high pressure of the extracted gases when analysing the extracted gas. In doing so, the means of solving this alleged contradiction should be as inexpensive as possible and require as little space as possible.

According to the invention, this task is accomplished by an apparatus for degassing a device, by a test system and by a method for degassing a device as may be recited in the independent claims. The dependent claims define preferred and/or advantageous embodiments of the present invention.

Within the framework of the present invention, there is provided an apparatus for degassing a device (in particular a degassing vessel). This apparatus comprises a control unit, a pump, a first volume or vessel, a second volume or vessel, a first valve and a second valve. The pump is connected to the first volume (also called the high-pressure volume) at a discharge end, in order to thus be able to pump gas into the first volume. The first volume and the second volume (also called the low-pressure volume) are connected to one another by means of the first valve, such that, depending on the state (opened or closed) of the valve, the first volume is connected to the second volume or the two volumes are separated. At an intake end, the pump is connected to the second volume via the second valve, such that the pump can pump gas out of the second volume when the second valve is opened. At the intake end, the pump can be connected to the device to be degassed, such that the pump can pump gas away from or out of the device when the pump is connected to the device.

The apparatus according to the invention advantageously makes it possible for the extracted gas to be pumped or conveyed into both volumes during the degassing, such that the pressure at the discharge end of the pump only slightly rises. After the degassing, the same pump can pump the extracted gas out of the second volume into the first volume, as a result of which the pressure of the extracted gas in the first volume increases. The present invention thus accomplishes the task posed above.

The second volume or low-pressure volume is preferably at least five times, and better ten times, and even better 20 times larger than the first volume or high-pressure volume. However, it is also possible that (depending on the amount of gas present and on the pump) the second volume or low-pressure volume is 100 times or even 1000 times larger than the first volume or high-pressure volume.

According to this embodiment, the high-pressure volume is significantly smaller than the low-pressure volume. The volume of the low-pressure volume is advantageously chosen such that the pressure at the discharge end of the pump does not rise during the degassing in such a way that the efficiency of the pump is impaired.

In an exemplary application, only very little gas (approx. 1 ml) can be available. In this case, the first volume (high-pressure volume) can be 0.5 ml in size and the second volume (low-pressure volume) can be 10 ml in size.

The absolute sizes of the volumes generally depend on how much gas is meant to, or can, be measured (i.e. is available). The absolute sizes for the volumes also depend on an employed sensor (for analysing the gas). It is certainly possible that the volumes are in the µl range (i.e. are significantly smaller than 1 ml). On the other hand, it is also possible for several liters of gas to arise (e.g. during measurement of emissions), with the volumes then being chosen to be correspondingly larger (in the range of 1 l to 20 l).

The ratios between the gas volume (volume of the gases to be analyzed, or degassing volumes) and the first and second volumes are substantially similar. The second volume (low-pressure volume) is mostly chosen to be equal to or larger than the gas volume, while the first volume (high-pressure volume) is significantly smaller. The ratios can depend on the pump employed. For example, when employing a high-pressure pump, the second volume (low-pressure volume) may only be, for example, one tenth of the gas volume. In this case, the second volume would therefore be smaller than the gas volume.

According to an inventive embodiment, with the aid of its control unit, the apparatus opens the first valve and closes the second valve. After the first valve is opened and the second valve is closed, the control unit activates the pump, in order to pump gas from the device to be degassed into the first volume and into the second volume which is connected to the first volume via the first valve.

Due to the first valve being opened, the pump, during the degassing step, pumps the gas into a very large volume corresponding to the sum of the first volume and the second volume. Due to this large volume, the pressure in this volume advantageously virtually does not rise during the degassing step. As a result, during the degassing step, it is possible to work for a very long time with as low a pressure as possible (ideally an absolute vacuum) in the first volume and a very low pressure difference between the first volume and the second volume. As a result is it advantageously possible to extract gases with a wide range of solubility coefficients from the device which is to be degassed, such that all of the gas can be released and the ratio of the extracted gases also corresponds to the ratio of the gases in the device (e.g. in the insulating oil).

According to an inventive embodiment, with the aid of its control unit, the apparatus closes the first valve and opens the second valve. After the first valve is closed and the second valve is opened, the control unit activates the pump, in order to pump gas from the second volume or low-pressure volume into the first volume or high-pressure volume.

Since the second valve is opened, the pump, after the degassing step, can pump gas out of the low-pressure volume into the high-pressure volume in the compressing step, in order to increase the pressure there. Through the higher pressure, the concentration of the gases is increased, which is favourable for a subsequent analysis.

According to an inventive embodiment, the apparatus comprises a third valve. The device to be degassed is connected to the intake of the pump via this third valve.

The third valve makes it possible for the apparatus to be connected permanently (via the third valve) to the device which is to be degassed. With this third valve, it is very simple to control the degassing step and the compressing step. During the degassing step, the third valve is opened, such that the pump can pump gas away from the device to be degassed. In contrast, the third valve is closed in the compressing step, such that the pump only pumps gas from the second volume (and no additional gas from the device) into the first volume. This is described more precisely in the following embodiments.

According to an inventive embodiment, with the aid of its control unit, the apparatus opens the first valve and the third valve and closes the second valve. After the first valve and the third valve are opened and the second valve is closed, the control unit activates the pump, in order to pump gas from the device to be degassed into the first volume and into the second volume which is connected to the first volume via the first valve.

Since the first valve and the third valve are opened, the pump, during the degassing step, pumps the gas into the first volume and into the second volume which is connected to the first volume via the first valve. As a result, during the degassing step, it is possible to work for a very long time with as very low pressure in the first and second volumes, as a result of which all gases can advantageously be released in the device.

According to an inventive embodiment, with the aid of its control unit, the apparatus closes the first valve and the third valve and opens the second valve. After the first valve and the third valve are closed and the second valve is opened, the control unit activates the pump, in order to pump gas from the second volume or low-pressure volume into the first volume or high-pressure volume.

Since only the second valve is opened and the first and third valves are closed, the pump only pumps gas out of the low-pressure volume into the high-pressure volume in the compressing step. Since the third valve is closed, no gas is drawn from the device by the pump, and since the first valve is also closed, there is also no gas drawn out of the high-pressure volume by the pump (via the low-pressure volume).

According to an embodiment according to the invention, the apparatus comprises a sensor. The sensor is arranged at least partially inside the first volume and is designed to analyze a gas in the first volume.

With the aid of the sensor, the analysis of the gas in the first volume or high-pressure volume can take place in a virtually automated manner after the compressing step. This sensor measures the gases. The sensor can be a semiconductor sensor, an optical sensor (or an optical measuring apparatus), a thermal conductivity sensor or a chemical analysis apparatus (e.g. a gas chromatograph), for example. In other words, the sensor is in particular any apparatus which can measure gases and—in this case—requires these gases in as high an (absolute) concentration as possible.

The apparatus according to the invention advantageously makes it possible for the degassing step and the compressing step to be performed with only one, or rather the same, pump. During the compressing step, the pressure in the high-pressure volume can be increased until a desired pressure value is reached, all of the gas is pumped out of the low-pressure volume or the capacity of the pump is exhausted. Through the use of only one pump both for the degassing and for the compressing, savings are advantageously made on both the space requirement and the costs for an additional pump.

Even if not all gas is pumped from the low-pressure volume into the high-pressure volume in the compressing step, the ratio of the gases advantageously remains the same as the ratio of the gases in the device (e.g. in the insulating oil). This would not be the case, for example, if the pump were to pump the gas directly from the device into the high-pressure volume in the compressing step. Furthermore, a higher pressure can be generated in the high-pressure volume during the compressing step than during direct degassing (without a low-pressure volume), since the intake pressure is higher.

Within the framework of the present invention, a test system is also provided for testing dissolved gases and gas at or in an installation, such as a high-voltage installation, for example. The test system comprises an evaluation unit and an apparatus, according to the invention, for degassing, as described previously. The test system is designed in order to perform an analysis of the gas in or from the installation (e.g. an analysis of the gas dissolved in the insulating oil of a high-voltage installation). The evaluation unit is designed in order to analyze the gas pumped into the first volume, for example with the aid of the sensor of the apparatus, and in order to draw up and advantageously output a result of the testing of the installation, depending on this analysis.

The test system according to the invention can, in a similar manner to the apparatus according to the invention, be employed on oil-insulated high-voltage installations, such as power transformers, current transformers, voltage transformers and gas-insulated switchgears. The gas to be analyzed can be a gas which is employed to insulate the high-voltage installation itself, or a gas which is released out of a liquid of an insulation or an insulating oil.

Finally, within the framework of the present invention, there is provided a method for degassing a device. This method comprises the following steps:

Connecting a first volume to a second volume. This step can be performed for example by opening a valve between the first volume and the second volume. This step virtually serves to prepare the following step.

Pumping a gas from the device into the first volume and thus into the second volume which has been connected to the first volume in the previous step. In this step, the gas is pumped from the device into a large volume composed of the first and second volumes. A large volume advantageously facilitates the degassing.

Breaking the connection between the first volume and the second volume. This step can for example also be carried out with the aid of the valve specified in the first step, by now closing this valve.

Pumping the gas from the second volume into the first volume. In this step, the gas is compressed by pumping into the first volume the portion of the gas which is extracted by the device and which is located in the second volume.

The advantages of the method according to the invention substantially correspond to the advantages of the apparatus according to the invention, which are previously described, such that we will refrain from repeating them here.

The device to be degassed is in particular a degassing vessel into which a liquid to be degassed (e.g. oil) is filled, for example manually. However, it is also possible that no manual process is required, for example by the liquid to be degassed being filled (pumped) automatically into the degassing vessel or by the gas which is fed to the apparatus according to the invention or the test system according to the invention and which is to be analyzed being taken directly from an installation (e.g. a high-voltage installation). In the latter case, the device to be degassed virtually corresponds to the installation.

In addition to the examination of high-voltage installations, the present invention can also generally be employed for gas measuring devices. Thus the present invention can be employed for quality control in the laboratory, for process analysis and process monitoring for:

Petrochemical and chemical plants

Natural gas processing plants

Biogas plants

Higher heating value determinations in online natural gas analyzes and in energy generation Measurement of emissions

BRIEF DESCRIPTION OF THE FIGURES

The invention is described in greater detail hereafter using preferred embodiments and with reference to the drawings.

DETAILED DESCRIPTION OF THE EXEMPLARY EMBODIMENTS

Figure 1:
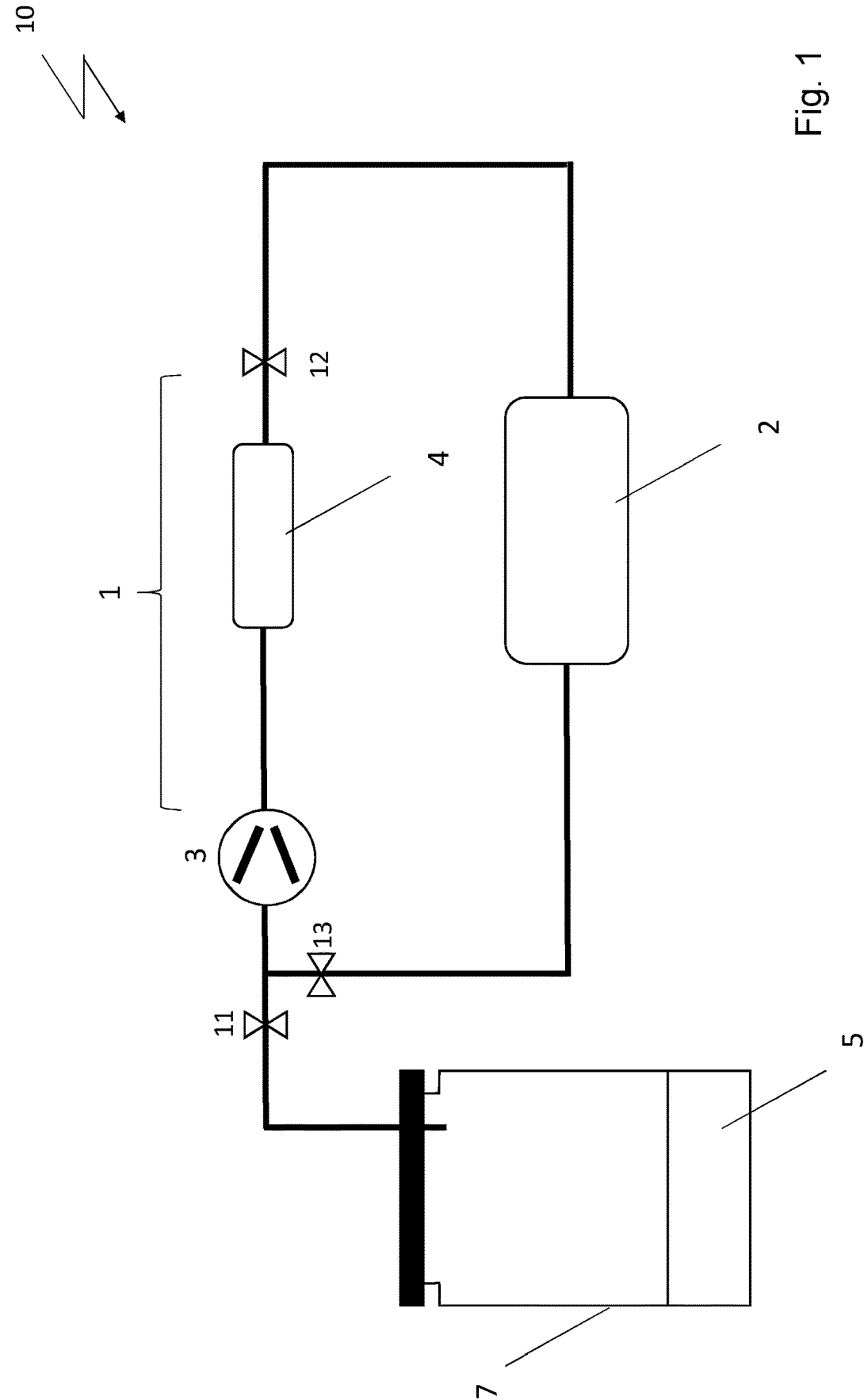
FIG. 1 schematically depicts an apparatus according to the invention, which is connected to a degassing vessel which is to be degassed.

FIG. 1 schematically depicts an apparatus 10 according to the invention, which is connected to a degassing volume or degassing vessel 7.

The apparatus comprises a first valve 12, a second valve 13, a third valve 11, a pump 3, a first vessel or volume 1, a second vessel or volume 2 and a sensor 4 which is arranged in the first volume 1. The first valve 12 is arranged between the first volume 1 and the second volume 2. In other words, the first volume 1 and the second volume 2 virtually form a large volume when the first valve 12 is opened. The pump 3 is arranged such that the pump, at the intake end, is connected to the degassing vessel 7 via the third valve 11 and/or is connected to the second volume 2 via the second valve 13.

For example, the degassing volume (volume of the degassing vessel 7) can have a volume content of approx. 300 ml (approx. 700 ml) (depending on the degassing vessel 7 used), the second volume 2 (low-pressure volume or expansion volume) can have a volume content of approx. 10 ml and the first volume 1 (high-pressure volume or analysis volume) can have a volume content of approx. 500 μl.

There is insulating oil 5 in the degassing vessel 7. The analysis of gases dissolved in this insulating oil 5 is performed with the aid of the sensor 4, in that these gases released from the insulating oil are pumped into the first volume 1 and are analyzed there with the aid of the sensor 4.

For this purpose, in the degassing step, the first valve 12 and the third valve 11 are opened and the second valve 13 is closed. Then the pump 3 pumps the gases out of the degassing vessel 7 into the first volume 1 and from there into the second volume 2 via the first valve 12. Then the first valve 12 and the third valve 11 are closed and the second valve 13 is opened. The pump 3 then pumps the gases out of the second volume 2 into the first volume 1, as a result of which the pressure in the first volume 1 and thus the concentration of the gases in the first volume 1 increases. When a maxi-mum possible pressure is achieved in the first volume 1, the gases are analyzed in the first volume 1 with the aid of the sensor 4.

Figure 2:
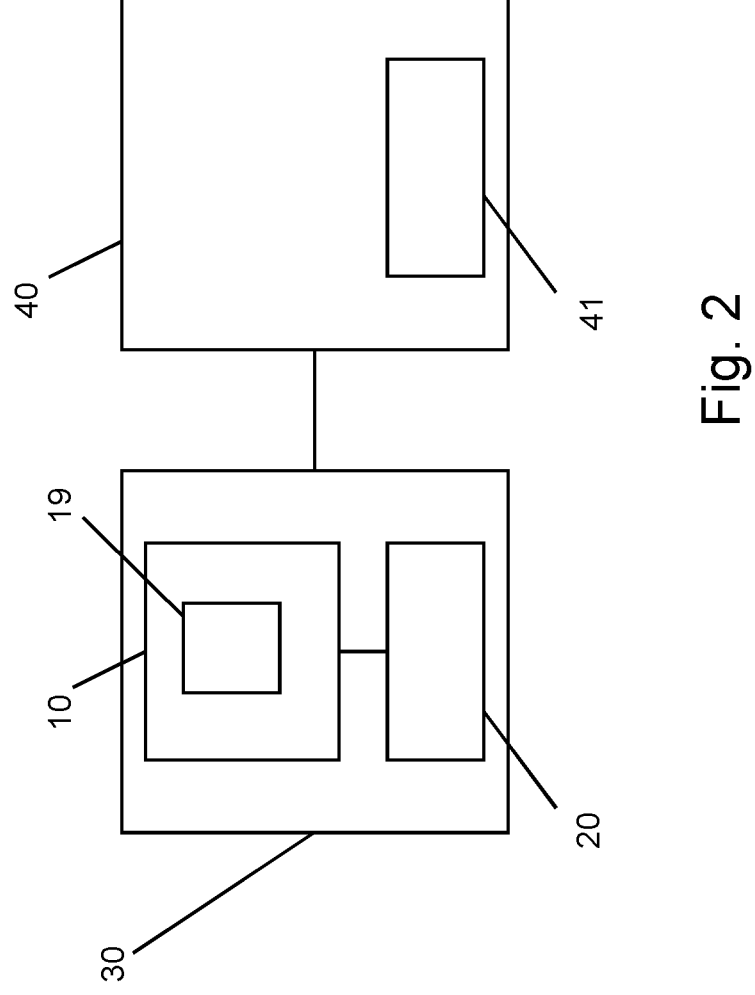
FIG. 2 schematically depicts a test system which is connected to a high-voltage installation which is to be tested.

The degassing process and the activation of the valves 11-13 and of the pump 3 is preferably performed automatically or in a computer-aided manner by means of a suit-able control unit (cf. the control unit 19 shown in FIG. 2).

A test system 30 according to the invention and a high-voltage installation 40 are schematically depicted in FIG. 2. The test system 30 is designed in order to examine an insulation 41 of the high-voltage installation 40. The test system 30 comprises an apparatus 10, according to the invention, for degassing, as described previously and schematically depicted in FIG. 1. Furthermore, the test system 30 comprises an evaluation unit 20, in order to draw up a result of the examination depending on the degassing, compressing and then analysis of the gas performed by the apparatus 10 with its control unit 19. The apparatus 10 analyzes a gas coming from the insulation 41, with the quality of the insulation 41, and thus a measurement of the operational readiness of the high-voltage installation 40 itself, being able to be determined by means of the analysis of this gas.

The invention claimed is:

1. An apparatus comprising a degassing vessel which is configured to be filled with a liquid to be degassed, the apparatus further comprising:

a pump, which, at a discharge end, is connected to a first volume, wherein the first volume is connected to a second volume via a first valve, wherein, at an intake end, the pump is connected to the second volume via a second valve and is configured to be connected to the degassing vessel, and a control unit configured to activate the pump and the first and second valves, the control unit being configured to open the first valve and close the second valve and to then pump gas, from the degassing vessel, into the first volume and into the second volume, which is connected to the first volume, by means of the pump.

2. The apparatus according to claim 1,
wherein the second volume is at least five times larger than the first volume.

3. The apparatus according to claim 1,
wherein the control unit is configured to close the first valve and open the second valve and to then pump gas from the second volume into the first volume by means of the pump.

4. The apparatus according to claim 1,
wherein the apparatus comprises a third valve, with which, at the intake end, the pump is connected to the degassing vessel.

5. The apparatus according to claim 4,
wherein the control unit is configured to open the first valve and the third valve and close the second valve and to then pump gas from the degassing vessel into the first volume, and into the second volume connected to the first volume, by means of the pump.

6. The apparatus according to claim 4,
wherein the control unit is configured to close the first valve and the third valve and to open the second valve and to then pump gas from the second volume into the first volume by means of the pump.

7. The apparatus according to claim 1,
wherein the apparatus comprises a sensor, which is arranged in the first volume, and the sensor is configured to analyze the gas in the first volume.

8. The apparatus according to claim 1,
wherein the apparatus is configured to degas a high-voltage installation.

9. A method of operating the apparatus of claim 1, the method comprising the following steps:
connecting the first volume to the second volume which is supplied separately from the first volume,
pumping a gas from the degassing vessel into the first volume and from there into the second volume which is connected to the first volume,
cutting the second volume off from the first volume and pumping the gas out of the second volume into the first volume.

10. The method according to claim 9,
wherein the second volume is at least five times larger than the first volume.

11. The method according to claim 9,
further comprising opening a first valve coupling the first volume and the second volume and closing a second valve coupling the second volume to a pump used for the pumping and then pumping gas, from the degassing vessel, into the first volume and into the second volume, which is connected to the first volume, by means of the pump.

12. The method according to claim 11,
further comprising closing the first valve and opening the second valve and then pumping gas from the second volume into the first volume by means of the pump.

13. The method according to claim 11,
further comprising opening the first valve and a third valve coupling the pump at an intake end to the degassing vessel and closing the second valve and then pumping gas from the degassing vessel into the first volume, and into the second volume connected to the first volume, by means of the pump.

14. A test system comprising:
an evaluation unit and an apparatus comprising a degassing vessel which is configured to be filled with a liquid to be degassed in order to carry out an analysis of the gas in or from the degassing vessel,
wherein the apparatus further comprises:
a pump, which, at a discharge end, is connected to a first volume,
wherein the first volume is connected to a second volume via a first valve,
wherein, at an intake end, the pump is connected to the second volume via a second valve and is configured to be connected to the degassing vessel, and
a control unit configured to activate the pump and the first and second valves, the control unit being configured to open the first valve and close the second valve and to then pump gas, from the degassing vessel, into the first volume and into the second volume, which is connected to the first volume, by means of the pump, and
wherein the evaluation unit is configured to analyze the gas pumped into the first volume and, depending on the analysis, to draw up a result of the testing of the device degassing vessel.

15. The test system according to claim 14,
wherein the control unit is configured to open the first valve and close the second valve and to then pump gas, from the degassing vessel, into the first volume and into the second volume, which is connected to the first volume, by means of the pump.

16. The test system according to claim 14,
wherein the control unit is configured to close the first valve and open the second valve and to then pump gas from the second volume into the first volume by means of the pump.

17. The test system according to claim 14,
wherein the apparatus comprises a third valve, with which, at the intake end, the pump is connected to the degassing vessel.

18. The test system according to claim 17,
wherein the control unit is configured to open the first valve and the third valve and close the second valve and to then pump gas from the degassing vessel into the first volume, and into the second volume connected to the first volume, by means of the pump.

* * * * *